(12) United States Patent
Baek et al.

(10) Patent No.: US 9,348,440 B2
(45) Date of Patent: May 24, 2016

(54) TOUCH SCREEN DEVICE FOR A PORTABLE TERMINAL

(71) Applicant: Samsung Electronics Co., Ltd., Gyeonggi-do (KR)

(72) Inventors: Sang-In Baek, Gyeonggi-do (KR); Min-Sung Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 229 days.

(21) Appl. No.: 13/735,278

(22) Filed: Jan. 7, 2013

(65) Prior Publication Data

US 2013/0176253 A1    Jul. 11, 2013

(30) Foreign Application Priority Data

Jan. 11, 2012    (KR) .................. 10-2012-0003409

(51) Int. Cl.
*G06F 3/041*    (2006.01)
*G06F 1/16*    (2006.01)

(52) U.S. Cl.
CPC .............. *G06F 3/041* (2013.01); *G06F 1/1626* (2013.01); *G06F 1/1643* (2013.01)

(58) Field of Classification Search
CPC ..... G06F 3/041; G06F 1/1626; G06F 1/1643; G02B 1/045
USPC ........................................................ 345/173
See application file for complete search history.

(56) References Cited

U.S. PATENT DOCUMENTS

| | | | |
|---|---|---|---|
| 2006/0115912 A1* | 6/2006 | Masumoto | G06K 15/1247 438/22 |
| 2008/0036746 A1* | 2/2008 | Klinghult | 345/176 |
| 2010/0052880 A1 | 3/2010 | Laitinen et al. | |
| 2010/0237374 A1* | 9/2010 | Chu et al. | 257/98 |
| 2010/0328260 A1* | 12/2010 | Chiu et al. | 345/174 |
| 2011/0156967 A1 | 6/2011 | Oh et al. | |
| 2011/0279394 A1 | 11/2011 | Kim | |
| 2011/0279405 A1 | 11/2011 | Meng | |
| 2011/0298670 A1 | 12/2011 | Jung et al. | |
| 2012/0306771 A1* | 12/2012 | Chen et al. | 345/173 |

FOREIGN PATENT DOCUMENTS

KR    10-2010-0085781 A    7/2010
KR       10-1007342 B1    1/2011

* cited by examiner

*Primary Examiner* — Mark Regn
(74) *Attorney, Agent, or Firm* — Cha & Reiter, LLC

(57) ABSTRACT

A touch screen device for a portable terminal includes an Indium Tin Oxide (ITO) film providing a touch screen feature; a light guide film attached onto one surface of the ITO film; and a light emitting device attached onto one surface of the ITO film and disposed in one side of the light guide film, wherein light output from the light emitting device provides lighting to an area where the light guide film is attached, while passing through the light guide film, and wherein the light guide film and the light emitting device are installed on the ITO film by a surface mounting process, thus reducing manufacturing costs and making it possible to secure more space capable of mounting other parts which in turn contribute in miniaturizing portable terminals.

12 Claims, 5 Drawing Sheets

TOUCH SCREEN DEVICE FOR A PORTABLE TERMINAL

CLAIM OF PRIORITY

This application claims the benefit under 35 U.S.C. §119(a) of a Korean Patent Application filed in the Korean Intellectual Property Office on Jan. 11, 2012 and assigned Serial No. 10-2012-0003409, the entire disclosure of which is hereby incorporated by reference.

BACKGROUND OF THE INVENTION

1. Field of the Invention

The present invention relates generally to a portable terminal, and more particularly, to a touch screen device for a portable terminal.

2. Description of the Related Art

In general, portable terminals such as mobile communication terminals and portable multimedia devices typically include a display device and a transparent window member mounted on the display device.

A portable terminal allows its user to input information or perform various manipulations using a separate input device such a keypad and a trackpad. Recently, however, as users may perform various functions such as Internet access and multimedia playback even on a mobile communication terminal, a touch screen is implemented on the display devices of portable terminals. That is, display devices having a sufficient size are mounted for Internet access and multimedia features, and instead of separate input devices, a touch screen feature incorporated on the display device serves as both input and output devices. Currently, the growing trend is that portable terminals are becoming thinner and smaller while the display area of a screen is getting larger to enhance the user's experience.

Despite implementing a touch screen feature, the most frequently used main function keys, for example, a Menu key (menu call key), a Back key (command key for turning back to the previous screen), and a Home key (command key for switching to the main screen), are generally provided at the bottom of the touch screen.

FIGS. 1 to 5 are diagrams showing the conventional touch screen device 10 with a structure in which the above-mentioned main function keys are disposed adjacent to each other in an area 11. The touch screen device 10 has a bezel that is formed on an inner surface of a window member 17 by conducting coating, and a logo of a carrier or a manufacturer may be printed in an area where the bezel is formed. A keypad area 13 is typically provided at one side of the area 11 and includes the frequently used main function keys such as a Menu key, a Back key and a Home key in the keypad area 13.

Referring to FIGS. 3 and 4, an Indium Tin Oxide (ITO) film 15, known as a touchpad, is attached onto the window member 17, and a substrate assembly 20 for providing lighting to the keypad area 13 is provided thereunder. The substrate assembly 20 includes a printed circuit board 21 on which light emitting devices 23 are disposed in their associated places corresponding to the keys disposed in the keypad area 13, and the substrate assembly 20 is installed to be accommodated between upper and lower cases 31 and 33 of the portable terminal.

The substrate assembly 20 has a thickness similar to or greater than that of the display device, thus making it difficult to ensure its installation space during the fabrication process. Further, such a cumbersome assembly has a drawback in efforts to miniaturize the portable terminal. Moreover, a separate manufacturing process for assembling and installing the substrate assembly 20 is required which in turn raises the manufacturing cost.

Further, referring to FIG. 5, when a pair of housings is coupled to each other in a slide manner, a space 35 for coupling slide rails should be secured on the face facing in the screen display direction. However, the substrate assembly 20 having a thickness similar to or greater than that of the display device is an obstacle in securing the space 35 for coupling slide rails. When the display device, the slide rail coupling space, and the substrate assembly are placed on the same plane due to the limited thickness of the portable terminal, there are many limitations, therefore, in expanding the display device and setting the position of the substrate assembly.

SUMMARY OF THE INVENTION

An aspect of an exemplary embodiment of the present invention is to provide a touch screen device capable of easily securing an installation space of a keypad lighting device and contributing to miniaturization of a portable terminal.

Another aspect of an exemplary embodiment of the present invention is to provide a touch screen device in which a keypad lighting device may be installed by a surface mounting process, thus contributing to a reduction in manufacturing cost.

Another aspect of an exemplary embodiment of the present invention is to provide a touch screen device capable of preventing an interference by a separate structure such as slide rails in design effort to expand the display screen.

In accordance with one aspect of the present invention, a touch screen device for a portable terminal includes an Indium Tin Oxide (ITO) film; a light guide film attached onto one surface of the ITO film; and one or more light emitting device attached onto one surface of the ITO film and disposed in one side of the light guide film, wherein light output from the light emitting device provides lighting to an area where the light guide film is attached while passing through the light guide film.

In accordance with another aspect of the present invention, a portable terminal having a first case and a second case includes: a display mounted on the first case; a window member covering the display; and a touch screen having an Indium Tin Oxide (ITO) film attached onto an inner surface of the window member; a light guide film attached onto one surface of the ITO film; and at least one light emitting device attached onto the one surface of the ITO film, wherein light output from the at least one light emitting device provides lighting to an area where the light guide film is attached thereto.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Exemplary embodiments of the present invention will now be described in detail with reference to the accompanying drawings. In the following description, descriptions of well-known functions and constructions are omitted for clarity and conciseness.

A touch screen device according to embodiments is described herein used with an exemplary portable mobile terminal. However, one of ordinary skill in the art will recognize that the touch screen device according to embodiments may also be utilized with other digital equipment, such as a portable media player, a PDA, a MP3 player, a tab, a navigation system, or a notebook computer. Further, touch may include any type of direct or indirect touch or contact, using, for example, a finger or stylus.

Figure 6:
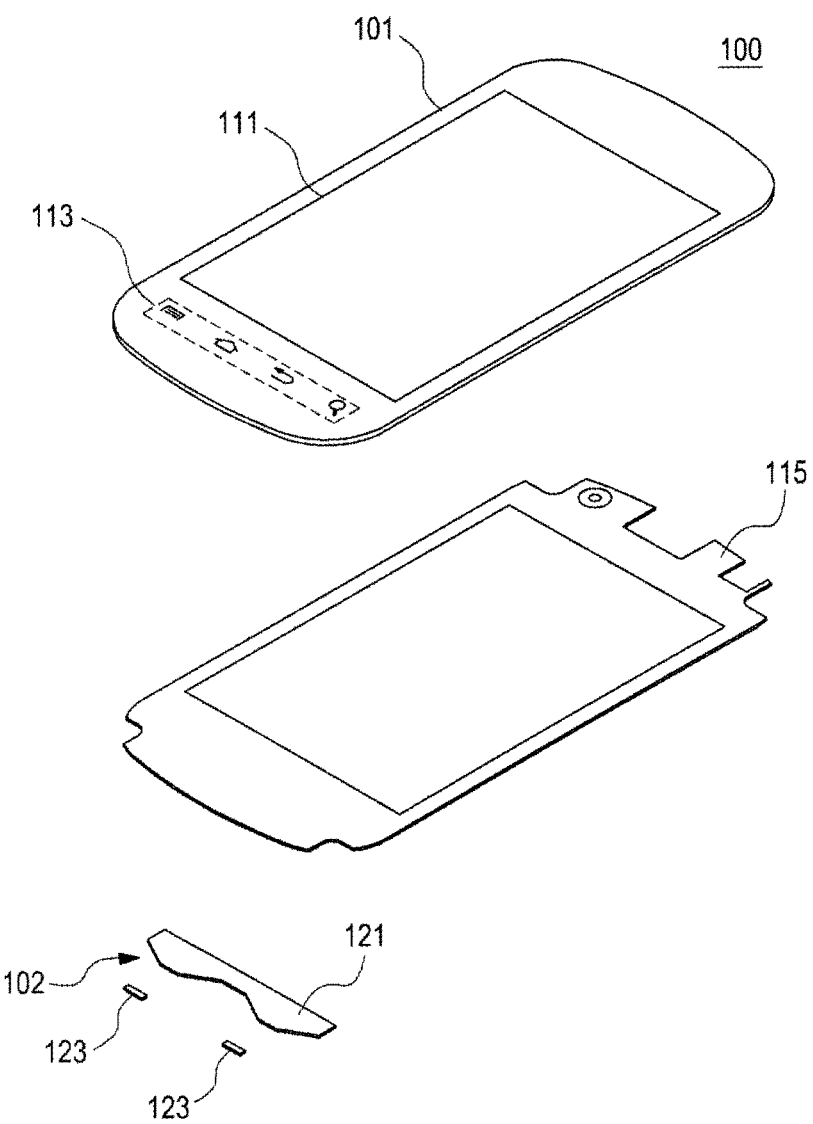
FIG. 6 is an exploded perspective view showing a touch screen device according to an exemplary embodiment of the present invention.
Figure 7:
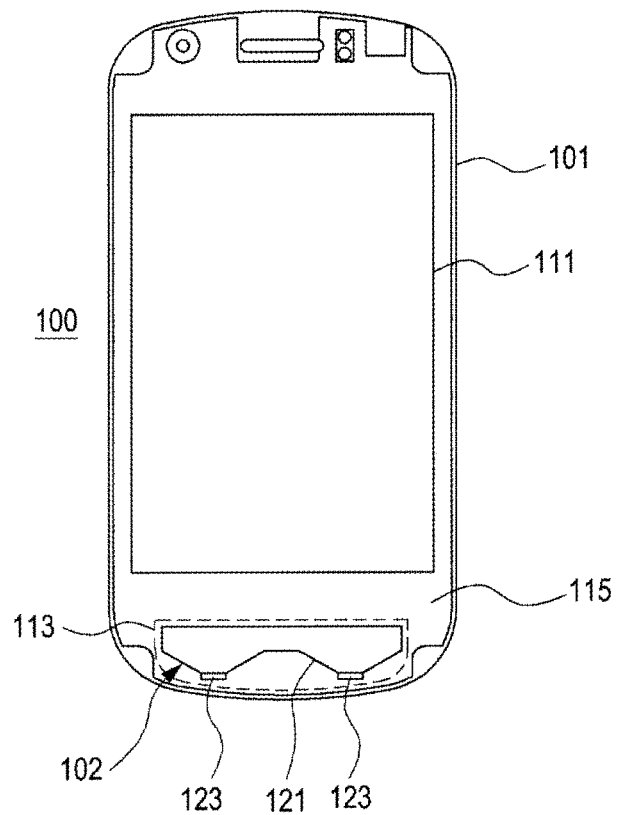
FIG. 7 illustrates the touch screen device shown in FIG. 6, which is installed on a case of a portable terminal.
Figure 8:
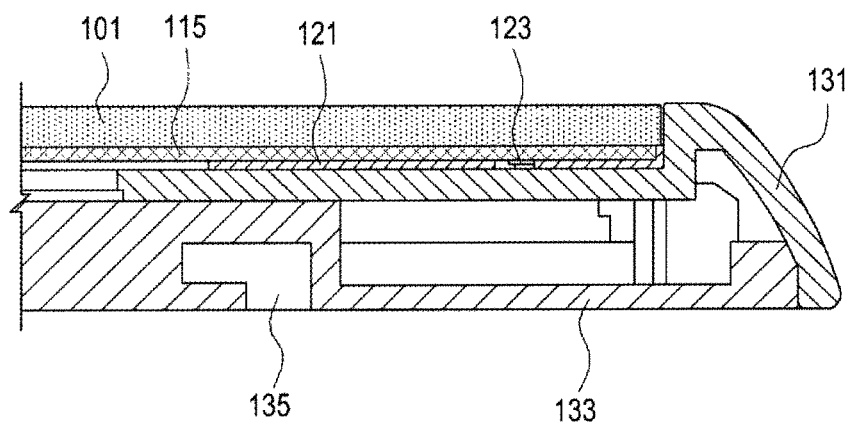
FIG. 8 is a cross-sectional view showing the touch screen device shown in FIG. 6, which is installed on a case of a portable terminal.

Referring to FIGS. 6 to 8, a touch screen device 100 for a portable terminal according to an exemplary embodiment of the present invention includes an Indium Tin Oxide (ITO) film 115 attached onto a window member 101, and a light guide film 121 and light emitting devices 123, which are disposed on the ITO film 115.

The touch screen device 100 is coupled to a display device (not shown) and used to manipulate a virtual keypad realized on a screen or to select and manipulate a specific character or icon, thereby moving to an information page linked thereto or performing an associated command. This is possible by detecting the user's manipulation input or a micro current of the human body by the ITO film 115. The ITO film 115 is attached onto the window member 101 protecting the display device, and provides screen images realized on the display device.

The window member 101 is made of a transparent material such as glass and acryl to protect the display device and provides images on the display device. A bezel may be formed on the edges of the window member 101 by black printing, and a logo of a carrier or a manufacturer may be printed thereon. A keypad area 113 is provided at one side of a screen transmitting area 111 of the window member 101. Icons representing frequently used main function keys such as a Menu key, a Back key and a Home key are printed on the window member 101 in the keypad area 113.

The ITO film 115 is attached onto an inner surface of the window member 101, and transparent electrodes are installed at a portion corresponding to the keypad area 113. The transparent electrodes installed at the portion of the ITO film 115, which corresponds to the keypad area 113, are set as the above-mentioned Menu key, Back key, Home key, etc. On the ITO film 115, the transparent electrodes installed at the portion corresponding to the keypad area 113 are disposed to face their associated icons in the keypad area 113, forming a keypad.

The light guide film 121 and the light emitting devices 123 are used as a lighting device 102 for the keypad formed in the keypad area 113. In other words, the light guide film 121 and the light emitting devices 123 are installed to allow the user to easily recognize keys on the keypad even in a dark environment. The light guide film 121 is attached onto one surface of the ITO film 115 in the area where the icons are formed, i.e., in the position corresponding to the keypad area 113, and the light emitting devices 123 are attached onto one surface of the ITO film 115 at one side of the light guide film 121. The light emitting devices 123 are preferably Light Emitting Diodes (LEDs), and are provided with power through transparent electrodes and circuit wirings formed on the ITO film 115.

Referring to FIG. 7, light generated in the light emitting devices 123 provides lightings in the area where the light guide film 121 is attached, in the keypad area 113, while passing through the light guide film 121. The light guide film 121 and the light emitting devices 123 may be installed on the ITO film 115 by a surface mounting process, thus making it possible to reduce processing costs in forming the lighting device 102 on the touch screen device 100.

Figure 1:
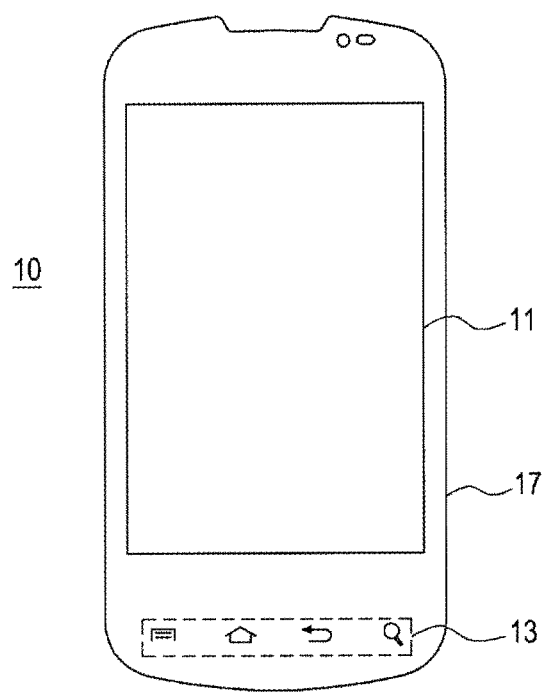
FIG. 1 illustrates a window member of a touch screen device according to an embodiment of the prior art.
Figure 2:
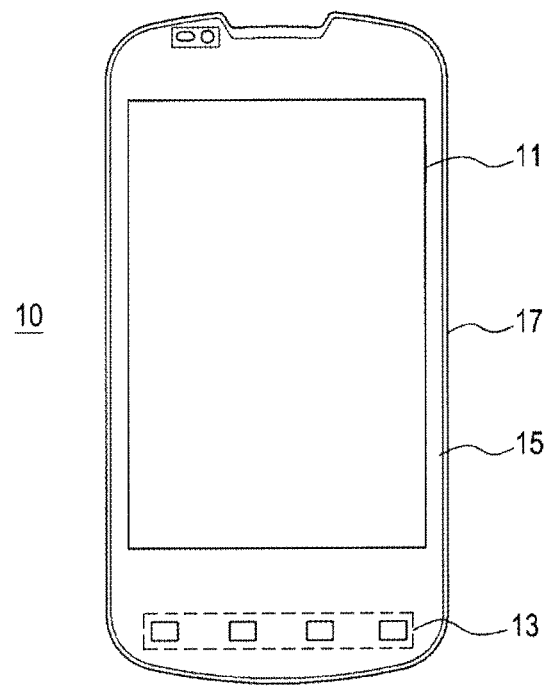
FIG. 2 illustrates an inner surface of the window member of the touch screen device shown in FIG. 1.
Figure 3:
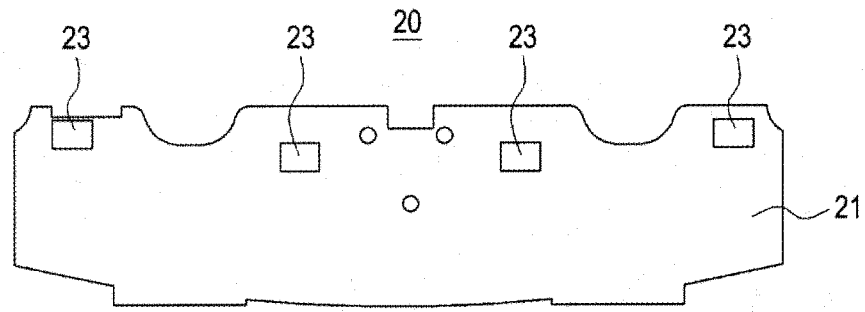
FIG. 3 illustrates a keypad lighting device installed together with the window member of the touch screen device shown in FIG. 1.
Figure 4:
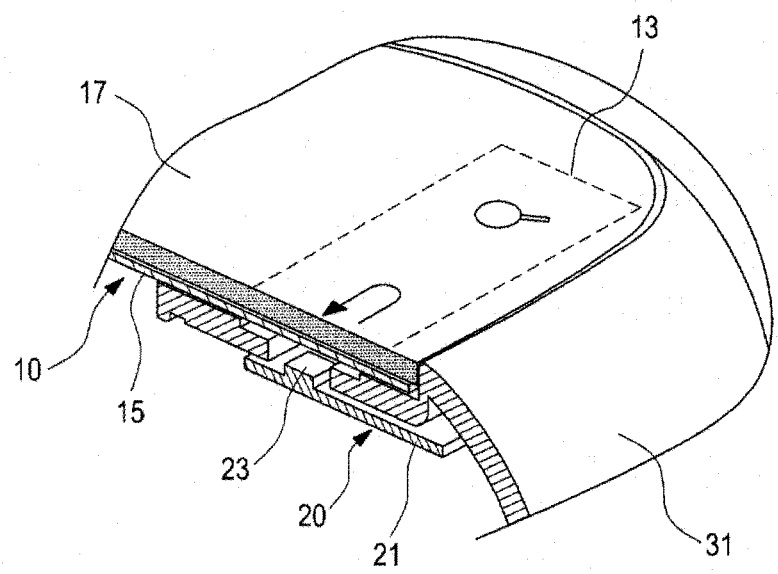
FIG. 4 is a partially cut view showing the touch screen device shown in FIG. 1, which is installed on a case of a portable terminal.
Figure 5:
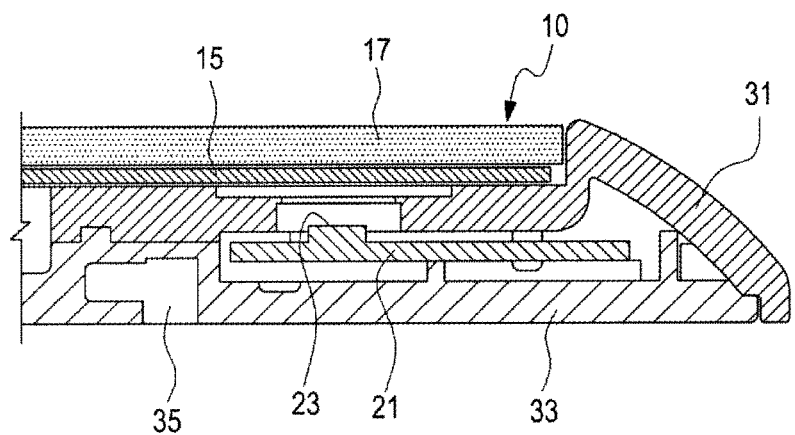
FIG. 5 is a cross-sectional view showing the touch screen device shown in FIG. 1, which is installed on a case of a portable terminal.

Referring to FIG. 8, compared to the substrate assembly 20 shown in FIG. 5, the lighting device 102 including the light guide film 121 and the light emitting devices 123 may reduce the space occupying between upper and lower cases 131 and 133 of the portable terminal since the lighting device 102 is compactly attached onto the bottom of the ITO film 115. Therefore, the inventive touch screen device 100 is advantageous in miniaturization efforts for the portable terminal and may even able to secure more part installation space, if needed, for the same-sized portable terminals.

Moreover, when a housing including the upper and lower cases 131 and 133 is coupled to another housing in a slide manner, the portable terminal according to the teachings of the present invention may more freely secure a space 135 for accommodating slide rails, compared to the conventional portable terminal. As such, the display device may be advantageously expanded by disposing the space 135 for accommodating slide rails to more right side than the position shown in FIG. 8. Note that in the prior art as shown in FIG. 5, the space 35 is fixed and cannot move more to the right as it is confined by the presence of the PCB 21. In the present invention, the presence of PCB 21 is absent, thus the space for the PCB 21 in the prior art can be used to locate the space 135 which in turn cause the space 135 to be placed more to the right direction. As a result, the shift of the space 135 causes the space for receiving the display unit to be more expanded. That is, in the prior art, when the display device, the slide rail coupling space, and the substrate assembly are placed on the same plane due to the limited thickness of the portable terminal, there are many limitations in expanding the display device and setting the position of the substrate assembly. In the present invention, there is no the substrate assembly for lighting the key pad area, but the light guide film 121 and the light emitting devices 123 are attached onto the bottom of the ITO film 115 and used as a lighting device 102 for the keypad in the present invention. Therefore, the space for disposing the substrate assembly 20 in the prior art is used to dispose the space 135 in the present invention more to the right, and the space 35 in the prior art can be now used to expand the space to receive the display device in the present invention. An installation position of the lighting device 102 may also be set freely because it is not interfered by the space 135 for accommodating slide rails. In the prior art, the movement of the light device is restricted by the space 135 as shown in FIG. 5. Thus, the keypad area 113 may be disposed more closely to the screen transmitting area 111 of the window member 101. As a result, the keypad area 113 may be designed to be disposed closely in the place where the user may conveniently hold and manipulate the portable terminal in which the touch screen device 100 is installed, while watching the screen.

As is apparent from the foregoing description, in the touch screen device for a portable terminal, the light guide film and the light emitting devices may be installed on the ITO film by a surface mounting process, thereby contributing to a reduction in manufacturing cost. In addition, power may be supplied to the light emitting devices through the circuit on the ITO film instead of the conventional printed circuit board, thus making it possible to reduce the space occupied by the keypad lighting device. Therefore, the inventive touch screen device may secure more space capable of mounting other parts for the same-sized portable terminals, and thus may contribute to miniaturizing portable terminals if there is no need to mount other parts. Moreover, since the keypad lighting device without the printed circuit board is disposed in the present invention, the coupling space for slide rails and the installation position of the main function keys may be easily adjusted and not restricted as in the prior art, thus contributing to expanding the size of the display device in the same-sized portable terminals.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A touch screen device for a portable terminal, comprising:
   a display device;
   a window member installed on the display device to protect the display device,
   an Indium Tin Oxide (ITO) film directly attached onto an inner surface of the window member;
   a light guide film directly attached onto one surface of the ITO film; and
   at least one light emitting device directly attached onto the one surface of the ITO film;
   wherein the at least one light emitting device is provided with power through transparent electrodes and circuit wirings formed on the ITO film, and light output from the at least one light emitting device provides lighting to an area where the light guide film is attached thereto.

2. The touch screen device of claim 1, further comprising icons formed on the inner surface of the window member, wherein the light guide film is disposed to face an area where the icons are formed.

3. The touch screen device of claim 2, wherein the ITO film further comprises a plurality of transparent electrodes corresponding to the area where the icons are formed.

4. The touch screen device of claim 1, wherein the light emitting device is a Light Emitting Diode (LED).

5. The touch screen device of claim 1, wherein the light guide film and the at least one light emitting device are installed on the ITO film by a surface mounting process.

6. Digital equipment comprising the touch screen device of claim 1.

7. The digital equipment of claim 6, wherein the digital equipment comprises a portable terminal, a PDA, a tab, a MP3 player, a PDA, a portable media player, or a note pad.

8. A portable terminal having a first case and a second case, comprising:
   a display provided on the first case;
   a window member covering the display; and
   a touch screen having an Indium Tin Oxide (ITO) film directly attached onto an inner surface of the window member;
   a light guide film directly attached onto one surface of the ITO film; and
   at least one light emitting device directly attached onto the one surface of the ITO film,
   wherein the at least one light emitting device is provided with power through transparent electrodes and circuit wirings formed on the ITO film, and light output from the at least one light emitting device provides lighting to an area where the light guide film is attached thereto.

9. The portable terminal of claim 8, further comprising icons formed on the inner surface of the window member, wherein the light guide film is disposed to face an area where the icons are formed.

10. The portable terminal of claim 8, wherein the ITO film further comprises a plurality of transparent electrodes corresponding to the area where the icons are formed.

11. The portable terminal of claim 8, wherein the light emitting device is a Light Emitting Diode (LED).

12. The portable terminal of claim 8, wherein the light guide film 121 and the at least one light emitting device are installed on the ITO film by a surface mounting process.

* * * * *